United States Patent
Li et al.

(10) Patent No.: US 11,579,720 B2
(45) Date of Patent: Feb. 14, 2023

(54) TOUCH PANEL AND ORGANIC LIGHT-EMITTING DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Bo Li, Hubei (CN); Wenqi Li, Hubei (CN); Weiguo You, Hubei (CN); Wenxu Xianyu, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 209 days.

(21) Appl. No.: 17/047,406

(22) PCT Filed: Sep. 3, 2019

(86) PCT No.: PCT/CN2019/104129
§ 371 (c)(1),
(2) Date: Oct. 14, 2020

(87) PCT Pub. No.: WO2021/012355
PCT Pub. Date: Jan. 28, 2021

(65) Prior Publication Data
US 2022/0197463 A1    Jun. 23, 2022

(30) Foreign Application Priority Data

Jul. 24, 2019    (CN) .......................... 201910670476.9

(51) Int. Cl.
*G06F 3/041* (2006.01)
*G06F 3/044* (2006.01)

(52) U.S. Cl.
CPC ........ *G06F 3/04144* (2019.05); *G06F 3/0412* (2013.01); *G06F 3/0446* (2019.05);
(Continued)

(58) Field of Classification Search
CPC combination set(s) only.
See application file for complete search history.

(56) References Cited

U.S. PATENT DOCUMENTS

2018/0067597 A1  3/2018  Kim et al.
2020/0241664 A1*  7/2020  Lee ..................... G06F 3/0416

FOREIGN PATENT DOCUMENTS

CN    107316838 A    11/2017
CN    107728849 A    2/2018
(Continued)

*Primary Examiner* — Deeprose Subedi
(74) *Attorney, Agent, or Firm* — Mark M. Friedman (57) ABSTRACT

A touch panel is configured to be disposed on a display panel. The touch panel includes a substrate layer, a first metal layer, an insulating layer covering the first metal layer, a second metal layer, and a protection layer disposed on the second metal layer. The first metal layer includes a plurality of pressure sensors and metal bridges. Each of the pressure sensors includes a pressure sensing electrode. The second metal layer is disposed on the insulating layer and includes a plurality of touch sensors. Each of the touch sensors includes a plurality of first electrodes and second electrodes spaced apart and electrically connected to each other through the metal bridges. The pressure sensing electrode is disposed below the first electrodes and the second electrodes and is electrically connected to a processing chip.

13 Claims, 5 Drawing Sheets

(52) U.S. Cl.
CPC ............... *G06F 2203/04111* (2013.01); *G06F 2203/04112* (2013.01)

(56) References Cited

FOREIGN PATENT DOCUMENTS

| | | |
|---|---|---|
| CN | 107885390 A | 4/2018 |
| CN | 108037844 A | 5/2018 |
| CN | 108319394 A | 7/2018 |
| CN | 108733261 A | 11/2018 |

\* cited by examiner

TOUCH PANEL AND ORGANIC LIGHT-EMITTING DISPLAY DEVICE

BACKGROUND OF INVENTION

1. Field of Invention

The present invention relates to a technical field of displays, and particularly to, a touch panel and an organic light-emitting display device.

2. Related Art

Touch screens are equipped with a responsive interface and can save a lot of time and improve work efficiency. Therefore, the touch screens have been used in our daily lives in all aspects, such as mobile phones, tablets, monitors, televisions, and other electronic devices.

In addition to simple touch functions, touch screens are further integrated with pressure sensing technology in order to increase different usage patterns of touch screens. The pressure sensing technology is popular among operators and consumers because its functions of sensing users' touch pressure, which effectively increases human-computer interaction modes, and enhancing operability and playability of electronic devices. At present, all electronic devices equipped with pressure sensing technology are implemented by means of pressure sensing sensors. The pressure sensing sensors are configured to include two layers of circuit boards, wherein an elastic element layer is disposed between the two layers of the circuit boards. When an external force is applied to the pressure sensing sensors, the elastic element is deformed, and capacitance values between the two layers of the circuit boards are changed, enabling chips to sense the change of the capacitance values so that a corresponding feedback action is performed. However, although an external pressure sensor adhesively bonded can realize human-computer interaction modes, and has characteristics of less difficulty in technique and easy to use, it also increases thickness of an entire electronic device, as well as product costs due to additionally adhesively bonding of an external pressure sensor.

SUMMARY OF INVENTION

An object of the present invention is to provide a touch panel and an organic light-emitting display device, capable of integrating a pressure sensing function and a touch function into a sensor, thereby to reduce thickness of a module and to achieve fabrication of a pressure sensor and a touch sensor by a one-time patterning process.

To achieve the above-mentioned object, the present invention provides a touch panel, configured to be disposed on a display panel. The touch panel comprises a substrate layer; a first metal layer disposed on the substrate layer and comprising a plurality of pressure sensors and metal bridges, wherein each of the pressure sensors comprises a pressure sensing electrode; an insulating layer disposed on the substrate layer and covering the first metal layer; a second metal layer disposed on the insulating layer and comprising a plurality of touch sensors, wherein each of the touch sensors comprises a plurality of first electrodes and second electrodes spaced apart from each other and electrically connected to each other through the metal bridges, wherein the pressure sensing electrode is disposed below the first electrodes and the second electrodes and is electrically connected to a processing chip; and a protection layer disposed on the second metal layer.

In one aspect of the present invention, the pressure sensing electrode comprises four coil units, and the coil units are each connected to each other by a continuously bending metal line.

In another aspect of the present invention, three of the coil units are configured in a mutually perpendicular arrangement, and are electrically connected to and spaced apart from the other coil unit, wherein each of the coil units is diamond in shape.

In another aspect of the present invention, each of the coil units is triangular in shape, and the four coil units are spaced apart from each other in a diamond configuration, so that the pressure sensing electrode is configured with the four coil units in a diamond configuration, wherein two opposite ends of each of the coil units are connected to two opposite ends of an adjacent one of the coil units, respectively.

In another aspect of the present invention, the display panel comprises an active display area and a peripheral area surrounding the active display area, and the pressure sensing electrode is disposed corresponding to a position of the peripheral area.

In another aspect of the present invention, the plurality of first electrodes and second electrodes cooperatively form metal meshes, wherein each of the metal meshes is arranged corresponding to a light-emitting pixel of the display panel.

In another aspect of the present invention, a reference resistance value is preset in the processing chip, and a varied resistance value is generated by the pressure sensing electrode according to a touch gesture, wherein the processing chip is configured to generate feedback signals different from each other according to difference values between the varied resistance value and the reference resistance value.

In another aspect of the present invention, the metal bridges of the first metal layer and the pressure sensing electrodes are simultaneously fabricated by a one-time patterning process.

The present invention further provides an organic light-emitting display device, comprising a display panel and a touch panel. The display panel comprises a base substrate, an array substrate disposed on the base substrate, a light-emitting layer disposed on the array substrate, and an encapsulation layer disposed on the light-emitting layer; and the touch panel comprising: a substrate layer disposed on the encapsulation layer; a first metal layer disposed on the substrate layer and comprising a plurality of pressure sensors and metal bridges, wherein each of the pressure sensors comprises a pressure sensing electrode; an insulating layer disposed on the substrate layer and covering the first metal layer; a second metal layer disposed on the insulating layer and comprising a plurality of touch sensors, wherein each of the touch sensors comprises a plurality of first electrodes and second electrodes spaced apart from each other and electrically connected to each other through the metal bridges, wherein the pressure sensing electrode is disposed below the first electrodes and the second electrodes and is electrically connected to a processing chip; and a protection layer disposed on the second metal layer.

The present invention further provides a touch panel, configured to be disposed on a display panel, the touch panel comprising a substrate layer; a first metal layer disposed on the substrate layer and comprising a plurality of pressure sensors and metal bridges, wherein each of the pressure sensors comprises a pressure sensing electrode; an insulating layer disposed on the substrate layer and covering the first metal layer; a second metal layer disposed on the insulating layer and comprising a plurality of touch sensors, wherein each of the touch sensors comprises a plurality of first electrodes and second electrodes spaced apart from each other and electrically connected to each other through the metal bridges, wherein the pressure sensing electrode is disposed below the first electrodes and the second electrodes and is electrically connected to a processing chip; and a protection layer disposed on the second metal layer; wherein the plurality of first electrodes and second electrodes cooperatively form metal meshes, and each of the metal meshes is arranged corresponding to a light-emitting pixel of the display panel, wherein the metal bridges of the first metal layer and the pressure sensing electrodes are simultaneously fabricated by a one-time patterning process.

Based on the touch panel of the present invention, the pressure sensing electrode is disposed below touch electrodes (i.e. the touch sensors) and is configured on a film layer the same as where the metal bridges are disposed, so that each of the touch electrodes is capable of providing both a pressure sensing function and a touch sensing function at the same time, thereby achieving integration of the pressure sensing function and the touch sensing function, effectively reducing a thickness of a product, reducing product costs, and offering various usage patterns of a product. That is, the touch panel of the present invention effectively overcomes drawbacks of conventional touch screens of which thickness and manufacturing costs are increased, and a pressure sensing function and a touch sensing function are not integrated into a same unit all because additional layers of pressure sensors are separately added to the conventional touch screens.

DESCRIPTION OF PREFERRED EMBODIMENTS

The following embodiments are referring to the accompanying drawings for exemplifying specific implementable embodiments of the present invention. Directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

Figure 1:
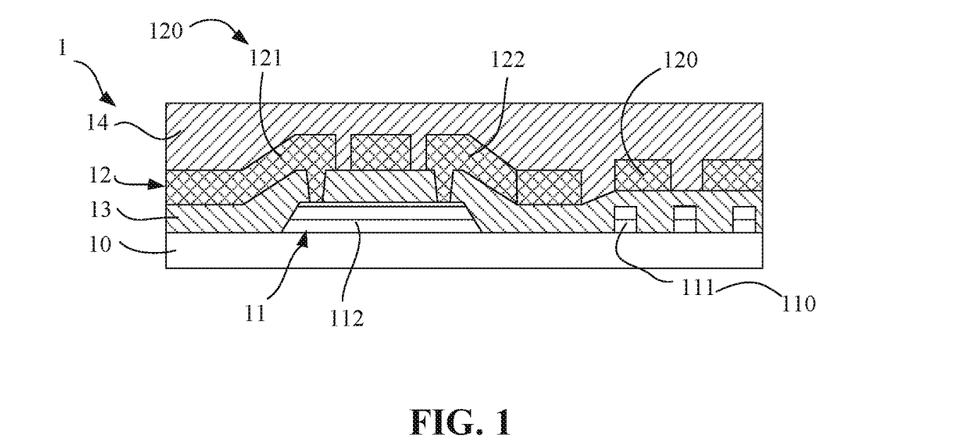
FIG. 1 is a schematic cross-sectional view of a touch panel in accordance with a preferable embodiment of the present invention.

The present invention provides a touch panel, configured to be disposed on a display panel to allow the display panel to have touch-control functions. FIG. 1 is a schematic cross-sectional view of a touch panel in accordance with a preferable embodiment of the present invention. As shown in FIG. 1, the present invention provides a touch panel 1 including a substrate layer 10, a first metal layer 11 disposed on the substrate layer 10, an insulating layer 13 disposed on the substrate layer 10 and covering the first metal layer 11, a second metal layer 12 disposed on the insulating layer 13, and a protection layer 14 disposed on the second metal layer 12. In a preferable embodiment, the insulating layer 13 and the protection layer 14 are each made of an inorganic material such as silicon oxide, but are not limited thereto.

Figure 2:
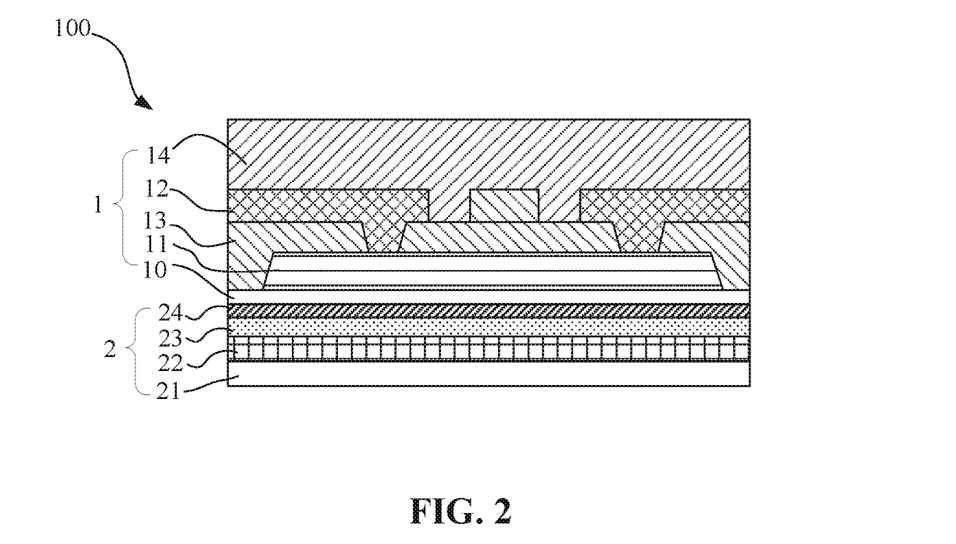
FIG. 2 is a schematic cross-sectional view of an organic light-emitting display device in accordance with a preferable embodiment of the present invention.

FIG. 2 is a schematic cross-sectional view of an organic light-emitting display device in accordance with a preferable embodiment of the present invention. Please refer to FIGS. 2 and 1. As shown in FIG. 2, the present invention further provides a display device 100. Specifically, the display device 100 includes a display panel 2 and a touch panel 1, wherein the touch panel 1 can be directly disposed on the display panel 2. In this preferable embodiment, the display panel 2 is an organic light-emitting diode display panel. The display panel 2 includes a base substrate 21, an array substrate 22 disposed on the base substrate 21, a light-emitting layer 23 disposed on the array substrate 22, and an encapsulation layer 24 disposed on the light-emitting layer 23. In this preferable embodiment, the array substrate 22 further includes a thin-film transistor (not shown). The light-emitting layer 23 is an organic light-emitting layer, and the light-emitting layer 23 and the array substrate 22 are encapsulated by the encapsulation layer 24 through a thin film encapsulation (TFE) process, so that the base substrate 21 is covered with the encapsulation layer 24, wherein the substrate layer 10 of the touch panel 1 is disposed on the encapsulation layer 24.

Please continue referring to FIG. 1 in combination with FIG. 2. The touch panel of the present invention provides not only touch-control functions but also pressure sensing functions, of which detailed structures are described below. As shown in FIG. 1, the first metal layer 11 includes a plurality of pressure sensors 110 and metal bridges 112, wherein each of the pressure sensors 110 includes a pressure sensing electrode 111. That is, the pressure sensing electrode 111 and the metal bridges 112 are disposed on a same metal film layer structure, i.e. the first metal layer 11. In one embodiment, the pressure sensing electrode 111 is made of a transparent electrically conductive material, such as indium tin oxide (ITO), indium zinc oxide (IZO) or grapheme.

Furthermore, the second metal layer 12 includes a plurality of touch sensors 120. Each of the touch sensors 120 includes a plurality of first electrodes 121 and second electrodes 122 spaced apart from each other, wherein the first electrodes 121 and the second electrodes 122 are made of a material the same as that of the pressure sensing electrode 111. In this preferable embodiment, the first electrodes 121 or the second electrodes 122 are electrically connected to each other through the metal bridges 112. Specifically, each of the first electrodes 121 or each of the second electrodes 122 is electrically connected to a corresponding one of the metal bridges 112 by passing through the insulating layer 13. That is, one of the first electrodes 121, one of the second electrodes 122, and one of the metal bridges 112 cooperatively form one of the touch sensors 120, wherein the first electrode 121 is a transmitting electrode (Tx) and the second electrode 122 is a receiving electrode (Rx).

Figure 5:
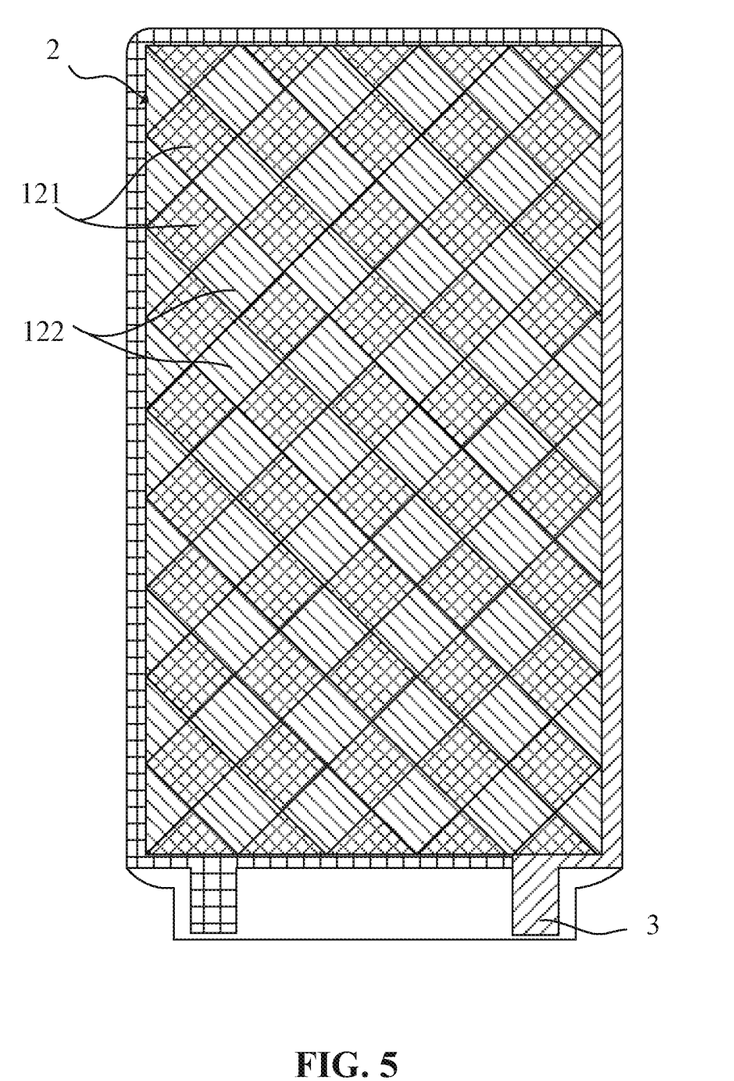
FIG. 5 is a schematic layout view of a touch sensor of the present invention.

Particularly, the pressure sensing electrode 111 is disposed below the first electrodes 121 and the second electrodes 122 and is electrically connected to a processing chip 3 (as shown in FIG. 5). Because the metal bridges 112 take up an area which is quite small in relation to the pressure sensors 110, the pressure sensing electrode 111 can be arranged within a coverage area of a corresponding one of the touch sensors 120, so that the pressure sensing electrode 111 and the metal bridges 112 are all disposed on a same film layer structure, i.e. the first metal layer 11. In other words, the pressure sensing electrodes 111 and the metal bridges 112 are fabricated by a one-time patterning process, and the pressure sensors 110 and the touch sensors 120 are simultaneously fabricated.

Figure 3:
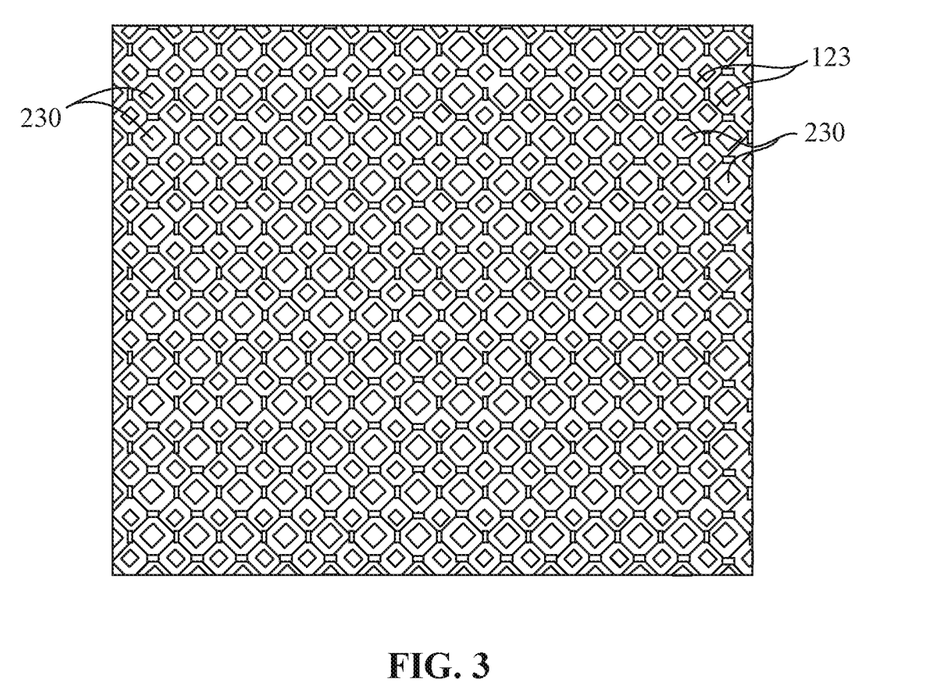
FIG. 3 is a schematic layout view of a touch sensor and a pressure sensor of the present invention.

FIG. 3 is a schematic layout view of the touch sensors and the pressure sensor of the present invention. As shown in FIG. 3, the display panel of the present invention includes a plurality of light-emitting pixels 230 including red light-emitting pixels, green light-emitting pixels, and blue light-emitting pixels. The first electrodes 121 and the second electrodes 122 cooperatively form metal meshes 123, wherein the metal meshes 123 are arranged corresponding to the light-emitting pixels 230, and the metal meshes are configured to avoid generating Moire interference strips. That is, the pressure sensors 110 are disposed along the metal meshes 123 without shielding luminescence of a screen.

Figure 4:
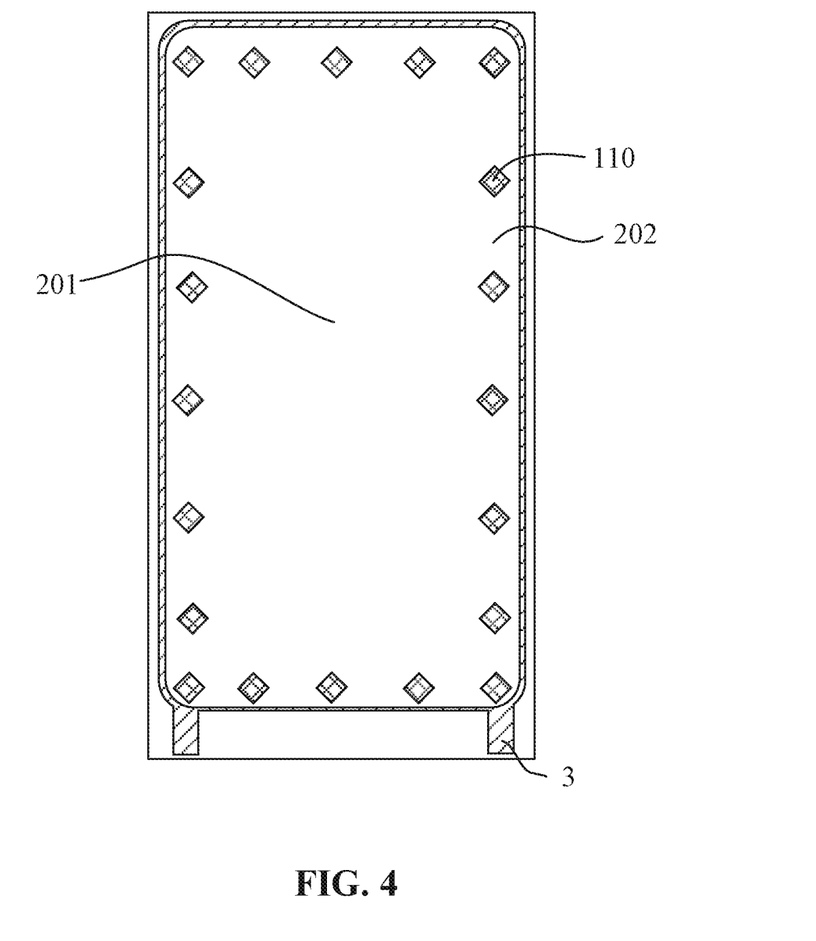
FIG. 4 is another schematic layout view of the pressure sensor of the present invention.

FIG. 4 is another schematic layout view of the pressure sensors of the present invention. As shown in FIG. 4, the display panel 2 includes an active display area 201 and a peripheral area 202 surrounding the active display area 201. Consider a usage pattern of mobile electronic devices (such as mobile phones) by users, in this preferable embodiment, the pressure sensors 110 are disposed corresponding to the peripheral area 202 so that users' touch can be responded easily for pressure sensing, but is not limited to a location of the peripheral area 202.

FIG. 5 is a schematic layout view of the touch sensors of the present invention. The first electrodes 121 (Tx) and the second electrodes (Rx) are perpendicularly arranged, respectively, and are disposed in a mesh arrangement. A plurality of the pressure electrodes 111 are correspondingly disposed below the first electrodes 121 and the second electrodes 122 and are connected to the processing chip 3.

Particularly, the pressure sensors of the invention are configured to operate as a resistor. Specifically, a reference resistance value is preset in the processing chip 3, and a varied resistance value is generated by the pressure sensing electrode according to a touch gesture, wherein the processing chip 3 is configured to generate various feedback signals according to difference values between the varied resistance value and the reference resistance value.

Figure 6A:
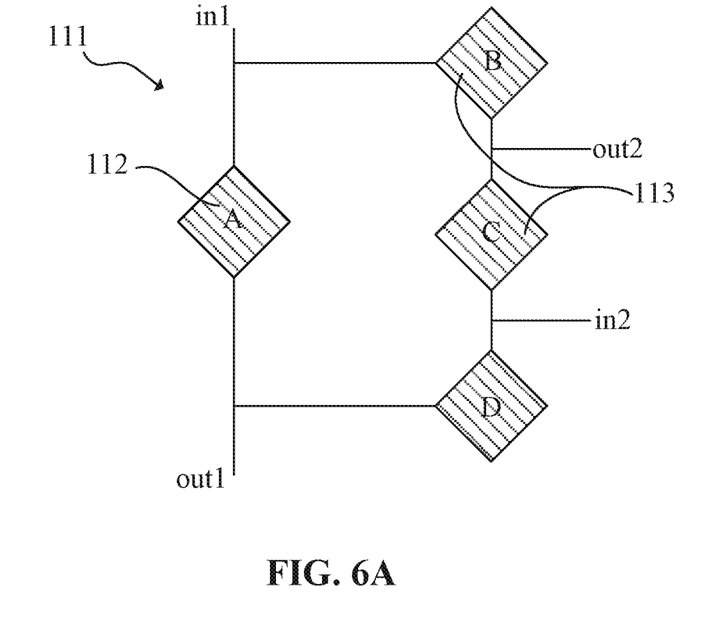
FIG. 6A is a schematic view of a pressure sensor of a preferable embodiment of the present invention.

FIG. 6A is a schematic view of a pressure sensor of a preferable embodiment of the present invention. As shown in FIG. 6A, the pressure sensing electrode 111 includes four coil units 112 and 113, and each of the coil units 112 and 113 is connected to each other by a continuously bending metal line. That is, the bending metal line has an S-shaped configuration. Specifically, three of the coil units 113 are configured in a mutually perpendicular arrangement and are electrically connected to and spaced apart from the other coil unit 112, wherein each of the coil units 112 and 113 is diamond in shape. In this embodiment, the coil unit 112 serves as a main pressure sensing element and is disposed at a distal end, while the other three coil units 113 serve as reference electrodes at the other end. In this manner, under an external pressure, the coil unit 112 is deformed, causing a change in an impedance of the coil unit 112, so that the processing chip 3 detects a signal change of the four input and output ports as shown in FIG. 6A, thereby performing feedback actions in response to the pressure.

Figure 6B:
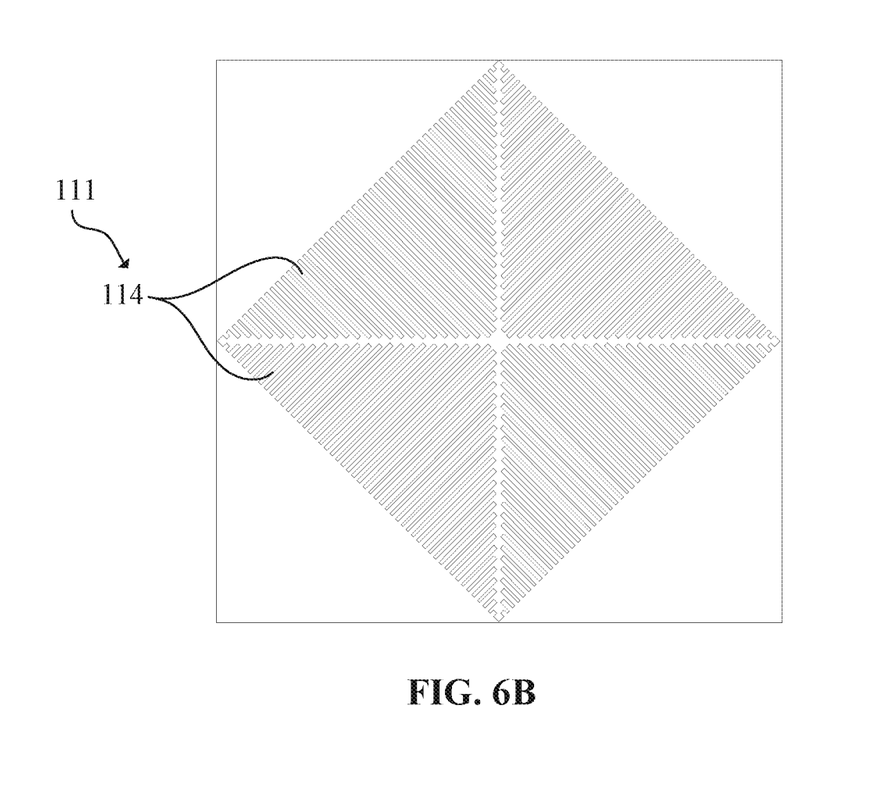
FIG. 6B is a schematic view of a pressure sensor of another embodiment of the present invention.

FIG. 6B is a schematic view of a pressure sensor of another embodiment of the present invention. As shown in FIG. 6B, the pressure electrode 111 includes four coil units 114, and each of the coil units 114 is formed by a continuously bending metal line. A difference from the coil unit as shown in FIG. 6A lies in that each of the coil units 114 in this embodiment is triangular in shape, and the four coil units 114 are spaced apart from each other to form the pressure electrode 111 being diamond in shape. Two opposite ends of each of the coil units 114 are connected to two opposite ends of an adjacent one of the coil units 114, respectively. A structural pattern of the coil unit of FIGS. 6A and 6B is configured to achieve the same function, so that a highly sensitive resistance change can be generated to respond to a touch position.

When the touch panel of the present invention is in use, an impedance of the pressure sensors 111 is changed under pressure such that the higher the pressure is applied to the touch panel, the greater the impedance is. The processing chip 3 is configured to generate various feedback signals according to difference values between the varied resistance value and the reference resistance value, so that different feedback actions can be performed. For example, one of the feedback actions is to call up a most commonly used software icon for a user through a system of an electronic device, so that the user can quickly select the software icon and execute the corresponding software. In another embodiment, an electronic device is a foldable mobile phone (not shown), and a pressure sensor may be disposed at where a folding axis is. When a pressure applied to the folding axis is changed by a mobile phone from an expanded state to a folded-up state, the pressure sensor at the folding axis senses a squeezing force and thus is enabled to provide signals to a system for performing a screen-out feedback.

Based on the touch panel of the present invention, the pressure sensing electrode is disposed below touch electrodes (i.e. the touch sensors) and is configured on a film layer the same as where the metal bridges are disposed, so that each of the touch electrodes is capable of providing both a pressure sensing function and a touch sensing function at the same time, thereby achieving integration of the pressure sensing function and the touch sensing function, effectively reducing a thickness of a product, reducing product costs, and offering various usage patterns of a product. That is, the touch panel of the present invention effectively overcomes drawbacks of conventional touch screens of which thickness and manufacturing costs are increased, and a pressure sensing function and a touch sensing function are not integrated into a same unit all because additional layers of pressure sensors are separately added to the conventional touch screens.

Accordingly, although the present invention has been disclosed as a preferred embodiment, it is not intended to limit the present invention. Those skilled in the art without departing from the scope of the present invention may make various changes or modifications, and thus the scope of the present invention should be after the appended claims and their equivalents.

What is claimed is:

1. A touch panel, configured to be disposed on a display panel, the touch panel comprising:
   a substrate layer;
   a first metal layer disposed on the substrate layer and comprising a plurality of pressure sensors and metal bridges, wherein each of the pressure sensors comprises a pressure sensing electrode, wherein the pressure sensing electrodes and the metal bridges of the first metal layer are simultaneously fabricated by a one-time patterning process;

an insulating layer disposed on the substrate layer and covering the first metal layer;

a second metal layer disposed on the insulating layer and comprising a plurality of touch sensors, wherein each of the touch sensors comprises a plurality of first electrodes and second electrodes spaced apart from each other and electrically connected to each other through the metal bridges, wherein the pressure sensing electrode is disposed below the first electrodes and the second electrodes and is electrically connected to a processing chip; and a protection layer disposed on the second metal layer.

2. The touch panel of claim 1, wherein the pressure sensing electrode comprises four coil units, and the coil units are each connected to each other by a continuously bending metal line.

3. The touch panel of claim 2, wherein three of the coil units are configured in a mutually perpendicular arrangement, and are electrically connected to and spaced apart from the other coil unit, wherein each of the coil units is diamond in shape.

4. The touch panel of claim 2, wherein each of the coil units is triangular in shape, and the four coil units are spaced apart from each other in a diamond configuration, so that the pressure sensing electrode is configured with the four coil units in a diamond configuration, wherein two opposite ends of each of the coil units are connected to two opposite ends of an adjacent one of the coil units, respectively.

5. The touch panel of claim 1, wherein the display panel comprises an active display area and a peripheral area surrounding the active display area, and the pressure sensing electrode is disposed corresponding to a position of the peripheral area.

6. The touch panel of claim 1, wherein a reference resistance value is preset in the processing chip, and a varied resistance value is generated by the pressure sensing electrode according to a touch gesture, wherein the processing chip is configured to generate feedback signals different from each other according to difference values between the varied resistance value and the reference resistance value.

7. An organic light-emitting display device, comprising a display panel and a touch panel, the display panel comprising:

a base substrate, an array substrate disposed on the base substrate, a light-emitting layer disposed on the array substrate, and an encapsulation layer disposed on the light-emitting layer;

wherein the touch panel comprises:

a substrate layer disposed on the encapsulation layer;

a first metal layer disposed on the substrate layer and comprising a plurality of pressure sensors and metal bridges, wherein each of the pressure sensors comprises a pressure sensing electrode, wherein the pressure sensing electrodes and the metal bridges of the first metal layer are simultaneously fabricated by a one-time patterning process;

an insulating layer disposed on the substrate layer and covering the first metal layer;

a second metal layer disposed on the insulating layer and comprising a plurality of touch sensors, wherein each of the touch sensors comprises a plurality of first electrodes and second electrodes spaced apart from each other and electrically connected to each other through the metal bridges, wherein the pressure sensing electrode is disposed below the first electrodes and the second electrodes and is electrically connected to a processing chip; and a protection layer disposed on the second metal layer.

8. The organic light-emitting display device of claim 7, wherein the pressure sensing electrode comprises four coil units, and each of the coil units is connected to each other by a continuously bending metal line.

9. A touch panel, configured to be disposed on a display panel, the touch panel comprising:

a substrate layer;

a first metal layer disposed on the substrate layer and comprising a plurality of pressure sensors and metal bridges, wherein each of the pressure sensors comprises a pressure sensing electrode;

an insulating layer disposed on the substrate layer and covering the first metal layer;

a second metal layer disposed on the insulating layer and comprising a plurality of touch sensors, wherein each of the touch sensors comprises a plurality of first electrodes and second electrodes spaced apart from each other and electrically connected to each other through the metal bridges, wherein the pressure sensing electrode is disposed below the first electrodes and the second electrodes and is electrically connected to a processing chip; and a protection layer disposed on the second metal layer;

wherein the plurality of first electrodes and second electrodes cooperatively form metal meshes, and each of the metal meshes is arranged corresponding to a light-emitting pixel of the display panel, wherein the metal bridges of the first metal layer and the pressure sensing electrodes are simultaneously fabricated by a one-time patterning process.

10. The touch panel of claim 9, wherein the pressure sensing electrode comprises four coil units, and each of the coil units is connected to each other by a continuously bending metal line.

11. The touch panel of claim 10, wherein three of the coil units are configured in a mutually perpendicular arrangement, and are electrically connected to and spaced apart from the other coil unit, wherein each of the coil units is diamond in shape.

12. The touch panel of claim 10, wherein each of the coil units is triangular in shape, and the four coil units are spaced apart from each other in a diamond configuration, so that the pressure sensing electrode is configured with the four coil units in a diamond configuration, wherein two opposite ends of each of the coil units are connected to two opposite ends of an adjacent one of the coil units, respectively.

13. The touch panel of claim 9, wherein a reference resistance value is preset in the processing chip, and a varied resistance value is generated by the pressure sensing electrode according to a touch gesture, wherein the processing chip is configured to generate feedback signals different from each other according to difference values between the varied resistance value and the reference resistance value.

* * * * *